June 17, 1924.

W. F. GROENE 1,498,512

FACING ATTACHMENT FOR LATHES

Filed Sept. 30, 1922   2 Sheets-Sheet 2

INVENTOR:
William F. Groene
BY Robt P Hains
ATTORNEY

Patented June 17, 1924.

1,498,512

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

FACING ATTACHMENT FOR LATHES.

Application filed September 30, 1922. Serial No. 591,547.

*To all whom it may concern:*

Be it known that I, WILLIAM F. GROENE, a citizen of the United States, residing in Cincinnati, county of Hamilton, and State of Ohio, have invented an Improvement in Facing Attachments for Lathes, of which the following description, in connection with the accompanying drawings, is a specification, like characters on the drawings representing like parts.

This invention relates to improvements in facing attachments for lathes.

In various lathe operations it may be desirable to advance a tool longitudinally of the lathe to perform one operation, and at the same time feed a different tool transversely of the lathe to perform a second operation.

It is usually desirable that the transversely movable tool be operated in timed relation with the longitudinally movable tools, and this may be accomplished by utilizing movement of the carriage longitudinally of the lathe to move a facing tool transversely of the lathe.

The primary object of the present invention, therefore, is to provide novel and simple means for imparting movement to a facing tool to feed the latter transversely of the lathe as the carriage moves longitudinally of the lathe.

Other objects of the invention and novel combination of parts will be hereinafter described in connection with the accompanying drawings which illustrate one good practical form thereof.

Figure 1:
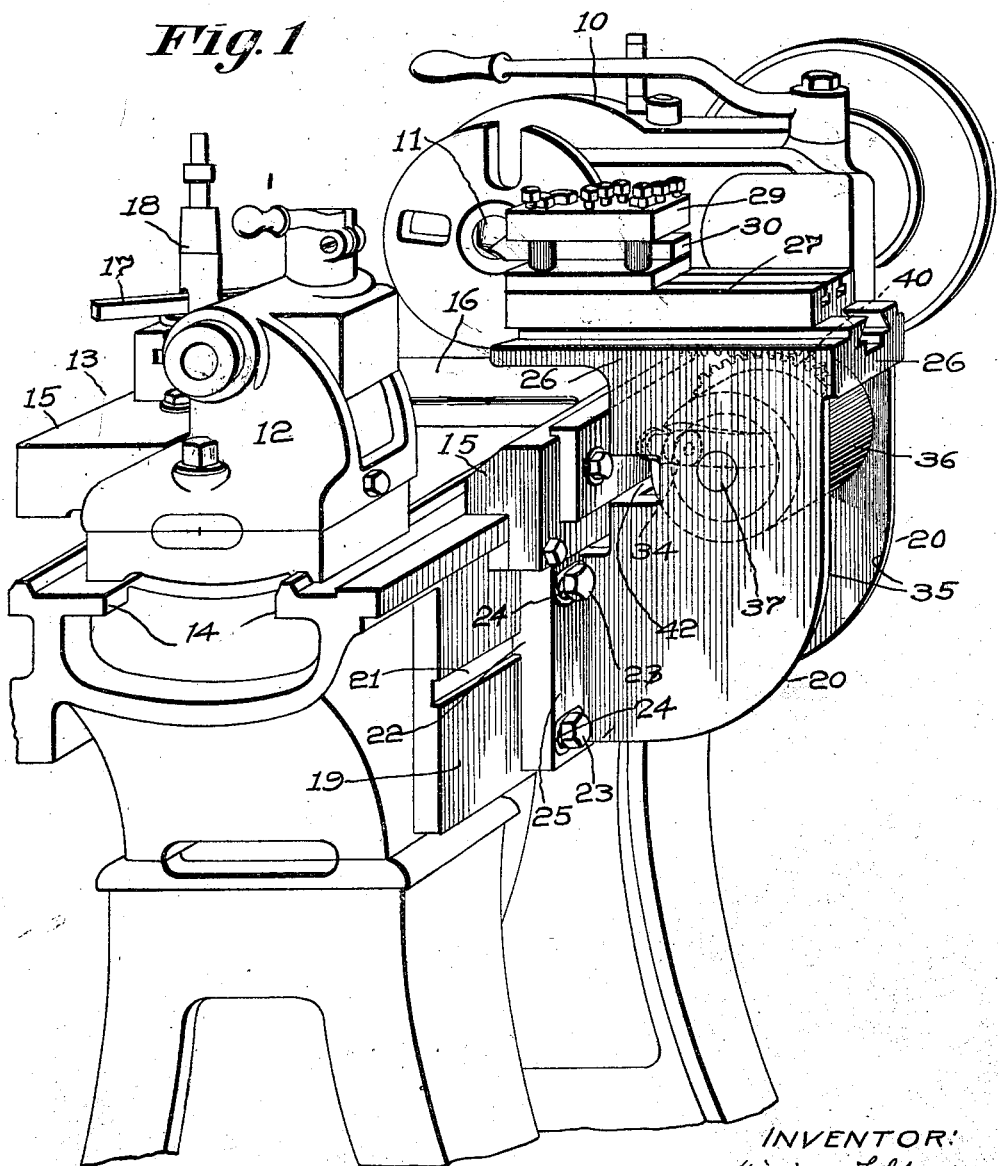
Fig. 1 is a perspective view of a lathe viewed from the rear side thereof and having the facing attachment of the present invention applied thereto.
Figure 2:
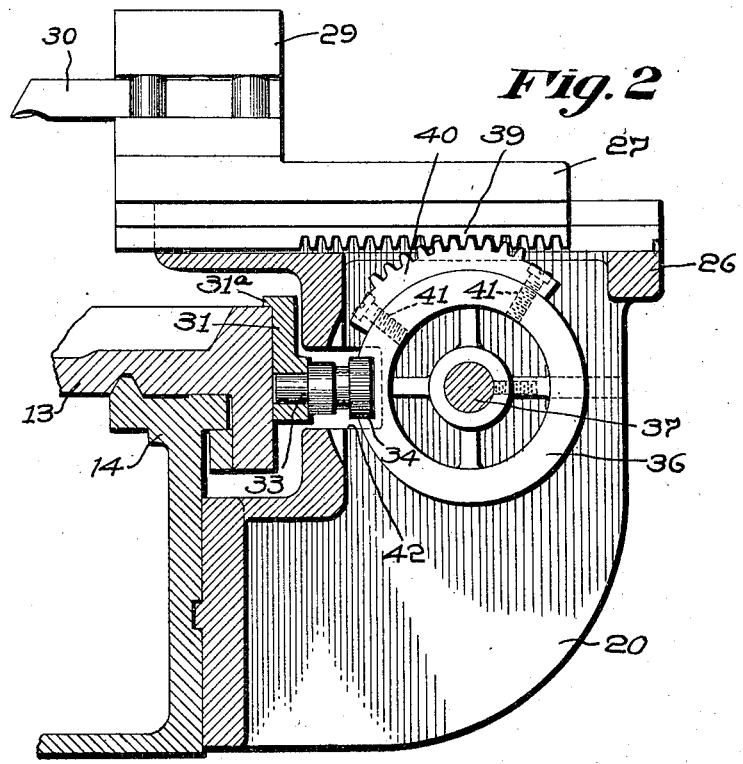
Fig. 2 is a vertical sectional view through the facing attachment of Fig. 1 and taken on the line 2—2 of Fig. 3.
Figure 3:
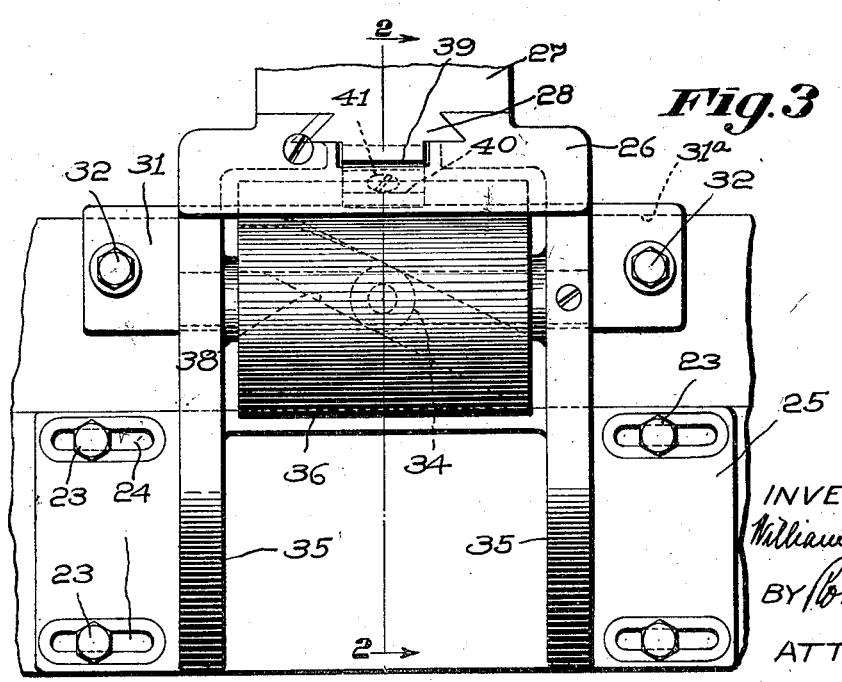
Fig. 3 is a rear view of the facing attachment shown, applied to the lathe.

The lathe shown in Fig. 1 for the most part may be of usual or any preferred construction, and has a head 10 provided with a live spindle 11 and a tail stock 12 which carries the usual dead spindle. The carriage 13 is mounted for sliding movement longitudinally of the lathe upon the bed 14, and this carriage as customary may have side portions 15 connected by the transversely extending portion 16. The ordinary turning tool 17 is supported upon the carriage 13 by the tool post 18.

The lathe shown has a plate 19 extending lengthwise of the rear side thereof and to this plate is secured the bracket 20. The plate 19 preferably has a slot 21 extending longitudinally thereof, and the bracket 20 is provided with a key 22 that extends into the slot 21. The arrangement is such that the bracket may be adjusted lengthwise of the lathe and may be rigidly secured in any desired position of adjustment by bolts 23 extending through elongated slots 24 formed in the laterally extending side portions 25 of the bracket. The bracket 20 extends upwardly above the lathe carriage and has a head 26, a portion of which may extend inwardly over the carriage 13. Upon the head 26 is mounted the tool carrier 27 which preferably has a dove-tailed portion 28 that is slidably secured to the head 26. Secured to the tool carrier 27 is a clamping device 29 which holds the facing tool 30 in place.

The bracket 20 supports the tool carrier 27 independently of the carriage 13 for movement transversely of the lathe; and simple means for satisfactorily imparting movement from the carriage to the tool carrier will now be described.

In the embodiment of the invention illustrated, a plate 31 is secured to the rear portion 15 of the lathe carriage by bolts 32, and the plate 31 may have a laterally extending lip 31ª that rests firmly upon the portion 15. Mounted upon the plate 31 and extending rearwardly therefrom is a stud 33 upon which is rotatably mounted a roller 34, and this roller cooperates with a cam surface or slot to be described.

The bracket 20 is shown as provided with spaced upwardly extending walls 35, and in the space between these walls is mounted a rocking member which is actuated by the roller 34 and imparts movement to the tool carrier 27. This rocking member may be variously constructed, and in the construction shown consists of a drum 36 mounted on a shaft 37 the ends of which extend into the walls 35. The drum shown has an inclined slot 38 formed in a wall thereof and the roller 34 extends into this slot. As a result of this construction movement of the carriage 13 along its bed moves the roller 34 within the slot 38 of the drum, and since the slot is inclined, rotative movement is imparted to the drum 36.

Rotation of the drum serves to slide the tool carrier 37 upon the head 26 transversely of the lathe. Various means may be provided to impart movement from the drum 36 to the tool carrier, and in the present case a rack 39 is provided along the lower face of the tool carrier and a segment of a gear 40 meshes with the rack and is secured to the drum 36 by bolts 41. The operating means shown and described will rotate the drum 36 contra-clockwise to feed the facing tool 30 inwardly as the carriage moves toward the lathe head, and will feed the tool outwardly as the carriage moves away from the lathe head.

The slot 38 may be given any desired inclination to vary the movement imparted to the tool carrier by the carriage, and if desired drums 36 having differently inclined slots may be kept on hand, and one drum may be easily removed and another drum having a differently inclined slot may be substituted in its place. An opening 42 may be formed in a side of the bracket 20 to permit the roller 34 to pass through a side of the bracket into engagement with the drum slot 38.

What is claimed is:

1. In a lathe, the combination of the bed, a carriage movable longitudinally on the bed, a bracket secured to and extending upwardly from the lathe frame, a facing tool carrier mounted upon the bracket for sliding movement transversely of the bed, an operating member for the carrier supported independently of the carriage for rocking movement, and having a cam surface, operating connections between the rocking member and facing tool carrier for imparting movement to the carrier when the rocking member is rocked, and a projection mounted on the carriage, and engaging the cam surface of the rocking member to impart rocking movement thereto as the carriage is moved along the bed.

2. In a lathe, the combination of the bed, a carriage movable longitudinally on the bed, a bracket secured to the lathe frame, a facing tool carrier mounted upon the bracket for sliding movement transversely of the bed, an operating member for the carrier rockingly mounted upon said bracket and having a cam surface, operating connections between the rocking member and carrier to operate the latter from the former, and a part movable with the carriage and cooperating with the cam surface of the rocking member to impart rocking movement thereto as the carriage is moved along the bed.

3. In a lathe, the combination of the bed, a carriage movable longitudinally on the bed, a bracket supported independently of the carriage, a drum mounted upon the bracket for rocking movement and having a cam surface, a tool carrier mounted upon said bracket for sliding movement transversely of the lathe by said drum, and a part movable with the carriage and adapted to cooperate with the cam surface to impart rocking movement to said drum.

4. In a lathe, the combination of the bed, a carriage movable longitudinally on the bed, a bracket supported independently of the carriage, a tool carrier slidably mounted on the bracket for movement transversely of the lathe, a rocking member supported by the bracket to impart sliding movement to the tool carrier and provided with an inclined slot, and a projection upon the carriage and extending into the inclined slot to rock said member upon movement of the carriage along its bed.

5. In a lathe, the combination of the bed, a carriage movable longitudinally on the bed, a bracket supported independently of the carriage, a drum rotatably supported by the bracket and having a cam slot formed in a wall thereof, a tool carrier mounted for movement transversely of the lathe by the drum, and a projection upon the carriage adapted to enter the cam slot to impart rocking movement to the drum upon movement of the carriage longitudinally of the bed.

6. In a lathe, the combination of the bed, a carriage movable longitudinally on the bed, a bracket supported independently of the carriage and having spaced upstanding walls, a tool carrier mounted upon the bracket for movement transversely of the lathe, a rocking member supported for rocking movement in the space between said walls and having a cam surface, means upon the carriage adapted to cooperate with the cam surface to rock said member upon movement of the carriage along its bed, and means for actuating the tool carrier from the rocking member to feed the carrier transversely of the lathe.

7. In a lathe, the combination of the bed, a carriage movable longitudinally along the bed, a facing tool carrier mounted for movement transversely of the bed, a drum supported for rocking movement about its axis and independent of the carriage and having a cam path, connections between the drum and facing tool carrier to effect movement of the latter transversely of the bed by rocking movement of said drum, and a part movable with the carriage and engaging the cam path of the drum to rock the drum as the carriage is moved longitudinally along the bed.

8. In a lathe, the combination of the bed, a turning tool carriage movable longitudinally along the bed, a facing tool carrier having rack teeth and mounted for movement transversely of the bed, an actuating member having a cam and mounted for rocking movement, a projection mounted on the turning tool carriage and engaging said cam to effect rocking movement of the rocking member as the carriage is moved longitudinally along the bed, and a gear segment connected to the rocking member and engaging the rack teeth of the facing tool carrier.

9. In a lathe, the combination of the bed, a carriage movable longitudinally on the bed, a fixed bracket supported independently of the carriage, a facing tool carrier slidably mounted upon the bracket for movement transversely of the bed, an actuating member supported by the fixed bracket for rocking movement, a connection between the actuating member and tool carrier for imparting movement from the former to the latter, and means upon the carriage engaging said operating member positively to move the carrier inwardly as the carriage moves in one direction and positively to move the carrier outwardly as the carriage moves in the opposite direction.

In testimony whereof, I have signed my name to this specification.

WILLIAM F. GROENE.